(12) United States Patent
Gustafsson

(10) Patent No.: US 7,140,406 B2
(45) Date of Patent: Nov. 28, 2006

(54) DEVICE FOR COMPENSATING FOR PRESSURE DROP

(75) Inventor: Per Gustafsson, Bjärred (SE)

(73) Assignee: Eco Lean Research & Development A/S, Copenhagen (DK)

( * ) Notice: Subject to any disclaimer, the term of this patent is extended or adjusted under 35 U.S.C. 154(b) by 0 days.

(21) Appl. No.: 11/432,073

(22) Filed: May 11, 2006

(65) Prior Publication Data

US 2006/0201579 A1 Sep. 14, 2006

Related U.S. Application Data

(62) Division of application No. 10/520,086, filed as application No. PCT/SE2003/001295 on Aug. 20, 2003, now Pat. No. 7,066,211.

(30) Foreign Application Priority Data

Aug. 21, 2002 (SE) .................................. 0202487

(51) Int. Cl.
*B65B 1/04* (2006.01)

(52) U.S. Cl. .................. 141/114; 141/95; 138/118; 138/119; 138/26; 138/174

(58) Field of Classification Search ............... 141/114, 141/95, 96, 2, 18, 301; 138/118, 119, 26, 138/30, 174
See application file for complete search history.

(56) References Cited

U.S. PATENT DOCUMENTS

| 2,735,642 | A | 2/1956 | Norman |
| 2,838,073 | A | 6/1958 | Di Mattia et al. |
| 2,875,786 | A | 3/1959 | Shelly |
| 3,536,102 | A | 10/1970 | Allewitz et al. |
| 4,979,441 | A | 12/1990 | Welch et al. |
| 5,137,175 | A * | 8/1992 | Kowalski et al. ............... 222/1 |
| 6,264,069 | B1 | 7/2001 | Hughes et al. |
| 7,066,211 | B1 * | 6/2006 | Gustafsson .................. 138/119 |

FOREIGN PATENT DOCUMENTS

| GB | 1 550 080 | 8/1979 |
| GB | 2 103 716 | 2/1983 |
| JP | 3-157599 | 7/1991 |

* cited by examiner

*Primary Examiner*—Steven O. Douglas
(74) *Attorney, Agent, or Firm*—Frommer Lawrence & Haug LLP; Ronald R. Santucci

(57) ABSTRACT

The invention relates to a device for compensating for pressure drop in a product pipe through which a liquid flows and a system comprising such a device. The device comprises a collapsible tube portion, which is connectible to the product pipe and is characterized by a limiting means, which is adapted to counteract stretching of the tube portion in the circumferential direction and which is adapted to allow free collapsing of the tube portion.

10 Claims, 4 Drawing Sheets

DEVICE FOR COMPENSATING FOR PRESSURE DROP

CROSS-REFERENCE TO RELATED APPLICATIONS

This is a division of U.S. patent application Ser. No. 10/520,086 filed Jul. 15, 2005 now U.S. Pat. No. 7,066,211 entitled "Device For Compensating Pressure Drop" which is a 371 filing of PCT/SE2003/001295 filed Aug. 20, 2003 and published on Mar. 4, 2004 under Publication No. WO 2004/018345 A and claims priority benefits from Swedish Patent Appln. No. 0202487-5 filed Aug. 21, 2002.

FIELD OF THE INVENTION

The present invention relates to a device for compensating for pressure drop in a product pipe through which a liquid flows, and a system for filling containers comprising such a device. The invention concerns more specifically such a device comprising a collapsible tube portion which is connectible to a product pipe.

BACKGROUND ART

A device for compensating for pressure drop in a product pipe through which a liquid flows is used, for instance, in the food industry for filling containers in a filling machine.

The filling machine is connected to the product pipe and has a filling station, at which liquid contents, such as milk or fruit juice, are introduced into the empty containers. To this end, the filling station usually comprises a filling pipe which via a filling valve is connected to the product pipe. For filling a container the filling pipe is inserted into the container, after which the filling valve is opened. When the filling valve is opened, liquid will thus flow through the filling valve and into the container. When a required volume has been transferred to the container, the filling valve is closed. The filling valve can be, for instance, time- or volume-controlled. Then the filled container can be conveyed to a sealing station, and a new empty container can be conveyed to the filling station.

When a filling valve is opened, a pressure drop arises in the product pipe. This pressure drop may cause 30 more or less serious disturbances.

The pressure drop can propagate to other filling stations which are connected to the product pipe and thus affect the filling processes which are controlled by the filling valves of the respective filling stations.

Furthermore the pressure drop can affect the filling process controlled by the filling valve in question. More specifically, the pressure drop affects the rate at which the product flows through the product pipe.

If the filling valve is time-controlled, the pressure drop thus constitutes an uncertainty with regard to the accuracy with which the container can be filled. The container can either be filled with too small or too large an amount of liquid.

If the filling valve is volume-controlled, the pressure drop implies that the filling time required for filling the container increases since the pressure drop causes a reduction of the flow rate of the product in the product pipe.

When the valve is closed after filling, a surge may be generated, propagating through the product pipe. This surge can be detrimental to the filling station and also affect the filling processes at other filling stations connected to the product pipe.

To eliminate, or in any case reduce, these disturbances caused by said pressure drop, a device for compensating for the pressure changes is usually connected to the product pipe.

Such a known device for compensating for pressure drop and pressure changes is the so-called balancing or level vessel, which is a container in which the liquid level is regulated by means of a float which controls the supply of liquid. The liquid level is regulated so as to always be kept within certain limits, independently of the discharge of liquid from the container. When liquid is discharged from the container, this occurs by gravity, and no pressure drop or surges that can propagate will arise, either at the beginning or at the end of the discharge. The construction, however, suffers from the drawback that it is difficult to clean and sterilise, which are important aspects in systems for filling of containers with liquid food contents. The construction is also relatively expensive to manufacture and install.

SE 410,844 discloses a device for compensating for surges in a product pipe through which a liquid flows, which device partly solves the problems of the above device as regards cleaning and sterilising. The device comprises a first and a second chamber, adjoining each other and being separated by means of a flexible wall. The first chamber has an inlet and an outlet to be connected in series to the product pipe. The second chamber is connected by a control means to a compressed air source. In case of surges in the product pipe, the wall of the first chamber is stretched in a manner that corresponds to the surge. The pressure in the second chamber is regulated so as to compensate for the change in volume of the first chamber. The pressure drop is taken care of by the first chamber being allowed to collapse.

The device according to SE 410,844, however, has a serious drawback since it has a most limited service life. The reason for this is the repeated stretching of the wall of the first chamber which is caused by said surges. Up to now, it has proved difficult to find a material which with an acceptable service life can be subjected to such strain.

U.S. Pat. No. 6,264,069 discloses a device for dampening surges from liquids. The device consists of an inner and an outer tube, the inner tube being connected to, for instance, a filling system for beverages. The device is intended to dampen surges from a pump in the system. A surge causes the inner tube to expand until it contacts the outer tube, which prevents further expansion.

The device described in U.S. Pat. No. 6,264,069, however, involves problems similar to those of the device of SE 410,844, i.e. the repeated stretching of the inner tube causes it to obtain a short service life.

U.S. Pat. No. 2,838,073 discloses a device which is adapted to dampen surges in a flame thrower. The device of U.S. Pat. No. 2,838,073 consists of a resilient inner tube of heavy rubber and an outer reinforced tube. When a surge arises, it will expand the inner tube to absorb the forces. The outer tube ensures that this expansion is only allowed to occur to a predetermined extent. Also this device has the problem of a short service life since the inner tube is stretched repeatedly.

U.S. Pat. No. 2,875,786 discloses a device for dampening surges from liquids. The device consists of an inner non-flexible perforated pipe, a flexible tube which is arranged immediately outside the pipe and a second, non-flexible tube which encloses the flexible tube. When a surge arises in a system, the flexible tube expands and, thus, dampens the surge. The other tube ensures that said expansion is only allowed to take place to a predetermined extent. Also U.S.

Pat. No. 2,875,786 has problems similar to those of U.S. Pat. No. 6,264,069 and U.S. Pat. No. 2,838,073 since the flexible tube is stretched repeatedly.

JP 3,175,599 discloses a hose for pressurised systems. The hose comprises an inner layer and an outer layer. A reinforced layer is arranged on the opposing sides of the respective layers. A plastic-reinforced layer is arranged between the reinforced layers. The plastic-reinforced layer serves only to allow the hose to expand to a predetermined extent. The hose of JP 3,175,599 is not intended to affect the pressure of a system, but still obtains a short service life caused by the repeated stretchings.

There is thus a need for a less expensive and easily cleaned device which can compensate for pressure drop in a product pipe and which also has a satisfactory service life.

SUMMARY OF THE INVENTION

In consideration of the above, an object of the present invention is to provide an improved device and an improved system for compensating for pressure drop in a product pipe.

A special object of the invention is to provide a device, and also a system for filling containers comprising such a device, for compensating for pressure drop in a product pipe, said device being relatively cheap, having a satisfactory service life and being easy to clean.

To achieve at least one of these objects and also other objects that will appear from the following description, a device and a system are provided according to the invention, having the features stated in claim 1 and claim 11, respectively, preferred embodiments being defined in the dependent claims.

More specifically, according to the present invention a device is provided for compensating for pressure drop in a product pipe through which a liquid flows, comprising a collapsible tube portion which is connectible to said product pipe. The device is characterized by a limiting means, which is adapted to counteract stretching of the tube portion in the circumferential direction and which is adapted to allow free collapsing of the tube portion.

This results in an improved device for compensating for pressure drop in a product pipe.

Since the device comprises a tube portion which is connectible to the product pipe, a device is obtained, which is extremely easy to clean. The device and its tube portion can, more specifically, be cleaned in connection with the cleaning of the actual product pipe.

Furthermore, the inventive device can be made to exhibit a satisfactory service life. By the stretching being counteracted and thus being essentially prevented, the tube portion will not be subjected to repeated stretching, thereby eliminating the problems associated with said stretching, i.e. a reduced service life as a result of the fatigue of the tube portion caused by said stretching.

The device is also inexpensive to manufacture, to install and to maintain since the construction is relatively simple and uncomplicated.

Nevertheless, the device is capable of efficiently taking care of pressure drop in the product pipe since the limiting means is adapted to allow free collapsing of the collapsible tube portion.

By free collapsing is meant that the tube will be able to unimpededly assume a collapsed state. Such free collapsing is decisive in order to be able to efficiently take care of pressure drop without subjecting the tube portion to strain which negatively affects its service life.

According to a preferred embodiment of the inventive device, the limiting means is integrated into a tube wall of the tube portion. As a result, a hygienic device is provided, which is easy to install as well as to keep clean.

The limiting means may comprise a reinforcement integrated into the tube wall. The reinforcement can easily be adjusted so that stretching of the tube portion is counteracted while free collapsing of the tube portion is allowed, thus obtaining a durable tube portion with a satisfactory service life.

According to another preferred embodiment, the limiting means is arranged outside the tube portion. This ensures that the limiting means may consist of a conventional reinforced tube, such as a fire hose. As a result, the inventive device can be provided from relatively inexpensive standard components, only said tube portion needing to be approved for foods since this is the only portion that will come into contact with the product.

The limiting means is advantageously inelastic in the circumferential direction. This counteracts stretching in the circumferential direction of the tube portion to such an extent that it is completely prevented.

The limiting means can have such a tensile strength as to prevent stretching in the circumferential direction of the tube portion at a pressure above atmospheric prevailing in the same in the range of 1–10 bar.

The limiting means is advantageously flexible so that free collapsing of the tube portion is ensured.

According to a further embodiment, the device comprises a casing, in which said tube portion and said limiting means are arranged, pressure means being arranged to apply a pressure prevailing in the casing, which is slightly below a normal pressure prevailing in the tube portion in operation. This ensures collapsing of the tube portion also in case of pressure drop where the resulting pressure in the tube portion exceeds the atmospheric pressure.

The pressure means can be a compressed air means, which in an easy and inexpensive way allows application of said pressure in the casing.

The tube portion of the device is preferably flexible and stretchable in order to achieve said collapsibility.

Moreover, according to the invention a system is provided for filling containers with liquid contents, comprising a product pipe which leads to at least one filling station with at least one filling valve. The system according to the invention is characterised by a device according to any one of the above devices, which is positioned upstream of said at least one filling station and connected to said product pipe and which is adapted to compensate for pressure drop in the product pipe.

This results in an improved system for filling, in which the system will benefit by the above advantages of the device.

According to a preferred embodiment of the inventive system, the tube portion is essentially linearly extended and arranged at an angle to the horizontal plane. This ensures that in case of pressure drop the tube portion collapses in a manner that promotes discharge of the product through the same. More specifically, collapsing will take place in the form of a squeezing filling motion which ensures that the product is discharged through the tube portion in a satisfactory manner.

The tube portion of the device is preferably arranged at an angle in the range 5–90°, more preferably in the range 10–45°, and most preferably in the range 25–35°.

BRIEF DESCRIPTION OF THE DRAWINGS

The invention will now be described in more detail by way of non-limiting embodiments and with reference to the accompanying drawings. Equivalent components in both embodiments have been given the same reference numerals.

DESCRIPTION OF A PREFERRED EMBODIMENT

Figure 1:
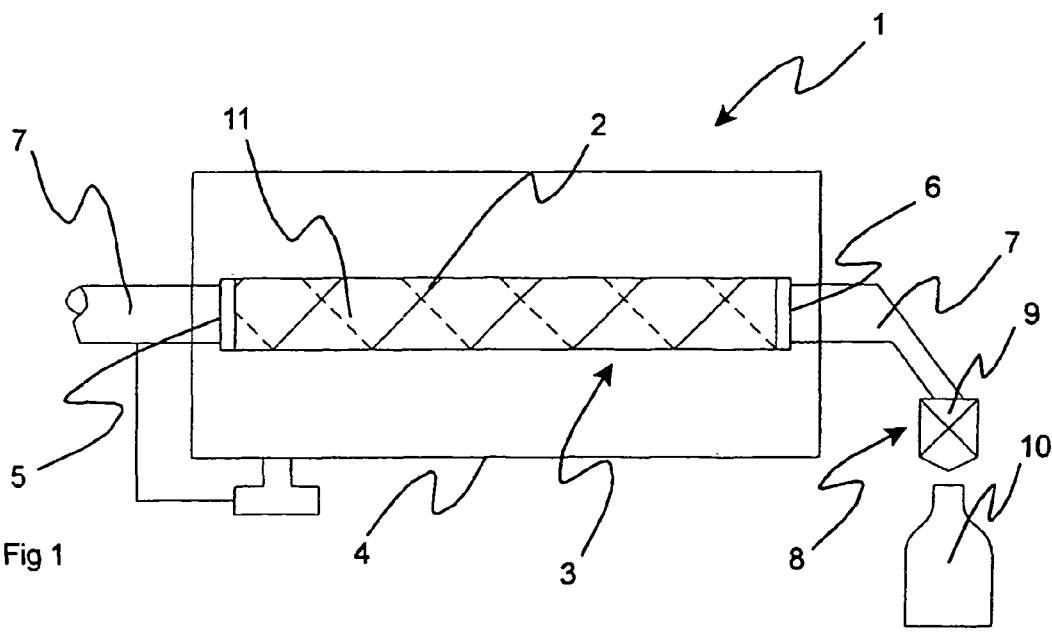
FIG. 1 is a side view of a device according to the invention in an unaffected state.

According to the present invention, a device for compensating for pressure drop in a product pipe is provided. Such a device is extremely advantageous in a system for filling of containers with liquid food contents, the contents being supplied through said product pipe.

Subsequently some preferred embodiments of the present invention will be described, components having an equivalent and similar function being throughout given the same reference numerals.

FIG. 1 to which reference is made, illustrates a first embodiment of an inventive device 1.

The device 1 comprises as main components a flexible tube portion 2, a limiting means 3 arranged outside the same and a casing 4 which encloses said tube portion 2 and said limiting means 3.

The shown embodiment of the inventive device 1 comprises an inlet 5 and an outlet 6 through which the device 1 is connected to a product pipe 7 in such a manner that the tube portion 2 of the device 1 forms part of the flow path of the product pipe 7. The part of the product pipe 7 which extends from the outlet 6 of the device 1 leads to a filling station 8 which is schematically shown in the form of a filling valve 9. The filling valve 9 is openable to allow discharge of a product flowing in the product pipe 7, for instance for filling a container 10.

The tube portion 2 is made of a flexible material which is stretchable in the circumferential direction and tends to collapse when applying a pressure which is below the ambient pressure in the tube portion 2. The device 1 is, as mentioned above, connectible to the product pipe 7 and comprises to this end said inlet 5 and outlet 6, by means of which the tube portion 2 of the device 1 can be connected to the product pipe 7 and be made to form part of the same.

The limiting means 3 arranged outside the tube portion 2 surrounds the tube portion 2 in the radial direction and is adapted to counteract stretching of the tube 2 in the circumferential direction.

Figure 4:
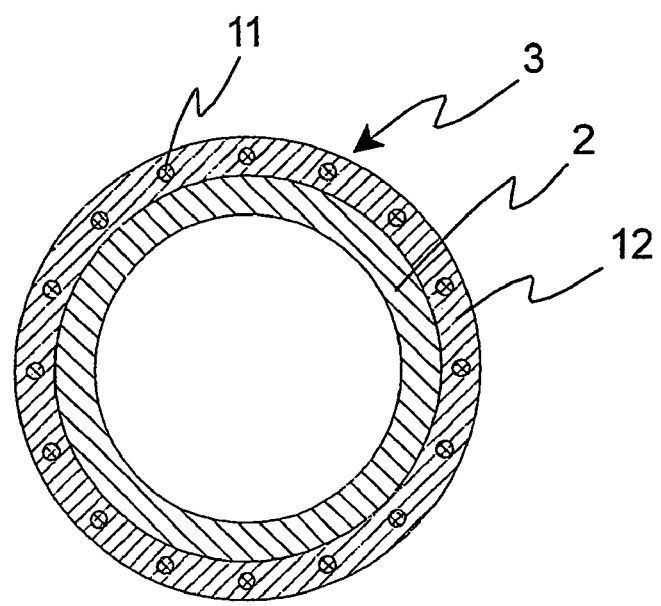
FIG. 4 is a cross-sectional view of an embodiment of the invention.

In the embodiment illustrated, the limiting means 3 is made in the form of a tube 12 of, for instance, fire hose type, which is woven from non-elastic threads, schematically shown at 11, said tube 12 being slipped over said tube portion 2 and thus effectively counteracting circumferential stretching thereof. This is illustrated more clearly in FIG. 4, to which reference is now also made.

The limiting means 3 can also be designed, for instance, so as to prevent stretching of the tube portion 2 in the circumferential direction when applying a pressure prevailing in the tube portion 2, which exceeds the ambient pressure by up to 10–20 bar.

It is important for the limiting means 3 to be such as to allow free collapsing of the tube portion 2. In other words, the limiting means 3 must be such as to not prevent collapsing of the tube portion 2. In order to ensure the function of the inventive device 1, which will be described in detail below, it is in fact most important for the tube portion 2 to be allowed to unimpededly assume a collapsed state.

It is thus not possible to make the limiting means 3 in the form of a rigid cylinder which is arranged in a tight-fitting manner on the outside of the tube portion 2. When the tube portion 2 collapses, its cross-section will in fact be changed so as to be compressed in one direction and stretched out in another, seen in a plane perpendicular to the longitudinal direction of the tube portion 2. If the limiting means 3 is made of a rigid cylinder arranged on the outside in a tight-fitting manner, this stretching out of the cross-section is prevented.

Consequently the limiting means 3 must be flexible so that it can collapse together with the tube portion 2 and thus allow this to unimpededly assume its collapsed state.

Figure 5:
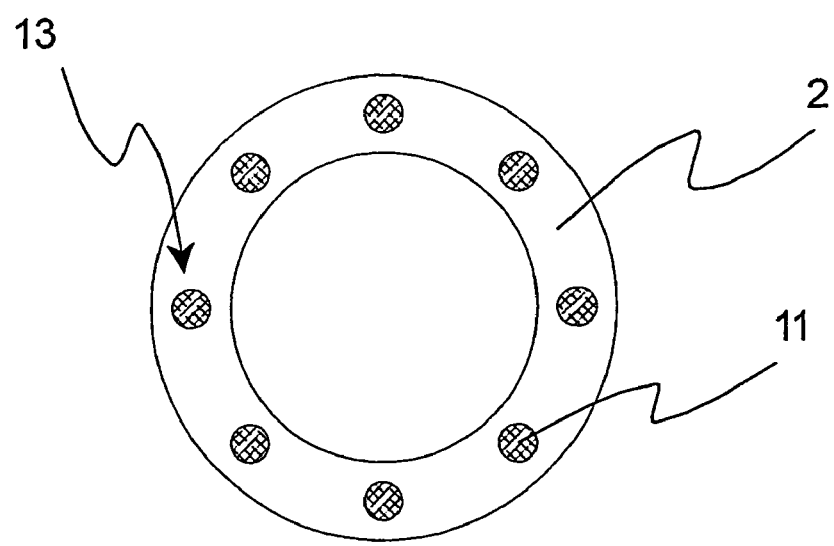
FIG. 5 is a cross-sectional view of a second embodiment of the invention.

It will be appreciated that the limiting means 3 can be provided in other ways. For instance, it is possible to integrate the limiting means 3 into the tube portion 2, which is illustrated in FIG. 5. More specifically, the limiting means 3 is made of a reinforcement 13 in the tube portion 2, said reinforcement 13 comprising non-elastic threads 11 integrated into the wall 14 of the tube portion 2, said threads 11 being oriented so as to counteract stretching of the tube portion 2 in the circumferential direction.

As is also evident from FIG. 1, to which reference is made once more, the device 1 comprises a compressed air means 15, which is adapted to affect the pressure prevailing in the casing 4. The pressure in the casing 4 affects the outside of the tube portion 2 and the limiting means 3 and can be varied according to the current normal pressure in the product pipe 7. The compressed air means 15 thus regulates the pressure in the casing 4 and is controlled by a sensor 16 which is arranged upstream of the device 1 and senses the pressure in the product pipe 7.

The casing 4 of the device 1 has openings 17, 18 through which the inlet and outlet 5, 6 of the tube portion 2 extend to allow connection of the device 1, more specifically its tube portion 2, to the product pipe 7.

Figure 2:
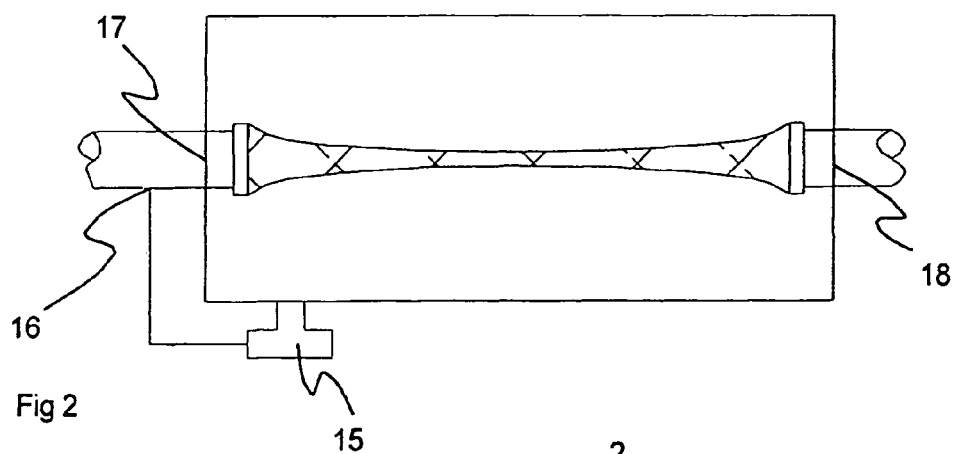
FIG. 2 is a side view of a device according to the invention in a state affected by pressure drop.

The function of the device 1 illustrated in FIG. 1 will now be described with reference to FIG. 2.

When the filling valve 9 is opened, for instance for filling a container 10, a pressure drop arises, which propagates through the product pipe 7. In response to the pressure drop, the tube portion 2 collapses, which is shown in FIG. 2. As described above, the limiting means 3 is arranged in such a manner that the tube portion 2 is allowed to collapse freely. The pressure drop caused by the opening of the filling valve 9 will thus be compensated for owing to the collapsing of the tube portion 2, the tube portion 2, while collapsing, changing its internal volume in a manner corresponding to the pressure drop. This ensures that the pressure in the product pipe 7 remains essentially unchanged, thereby achieving the required accuracy for discharging the product through the filling valve 9.

The tube portion 2 is allowed to collapse freely so that, in its completely collapsed state, it assumes a flat shape. When the tube portion 2 is allowed to collapse in this way, no harmful folds arise, which could be detrimental to the service life of the tube portion 2.

When the filling valve 9 is closed, for instance when a container 10 has been filled to the required extent, a surge arises. The surge is absorbed, i.e. dampened, at least partly by the tube 2 once it assumes its original, non-collapsed state and its volume increases once more, as shown in FIG. 1.

Figure 3:
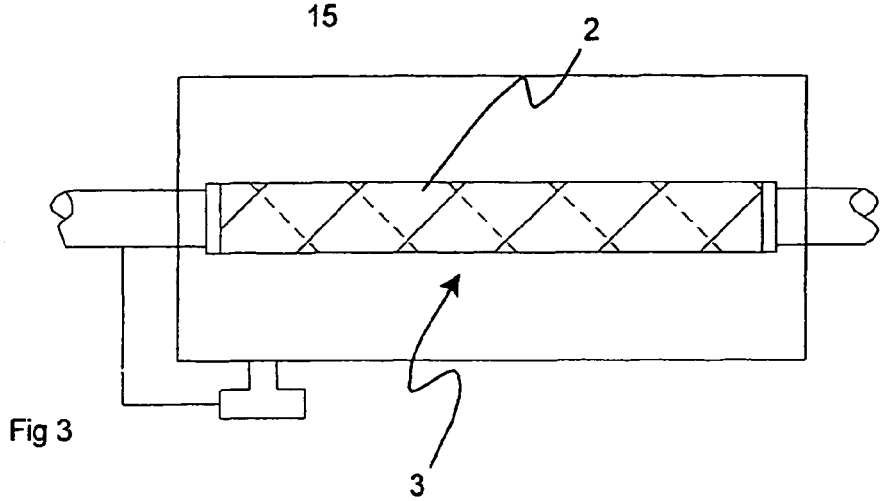
FIG. 3 is a side view of a device according to the invention in a state affected by surge.

The limiting means 3 can be adapted to allow a small degree of expansion in the radial direction, implying that the tube portion 2 is only allowed to stretch slightly, such as by a few percent, in the circumferential direction, which is illustrated in FIG. 3. This results in additional dampening of the surge caused by the closing of the filling valve 9. However, it is essential for this stretching in the circumferential direction to be kept small so as to guarantee the necessary service life of the tube portion 2. By small stretching is meant stretching which is less than 5% in the circumferential direction.

Figure 6:
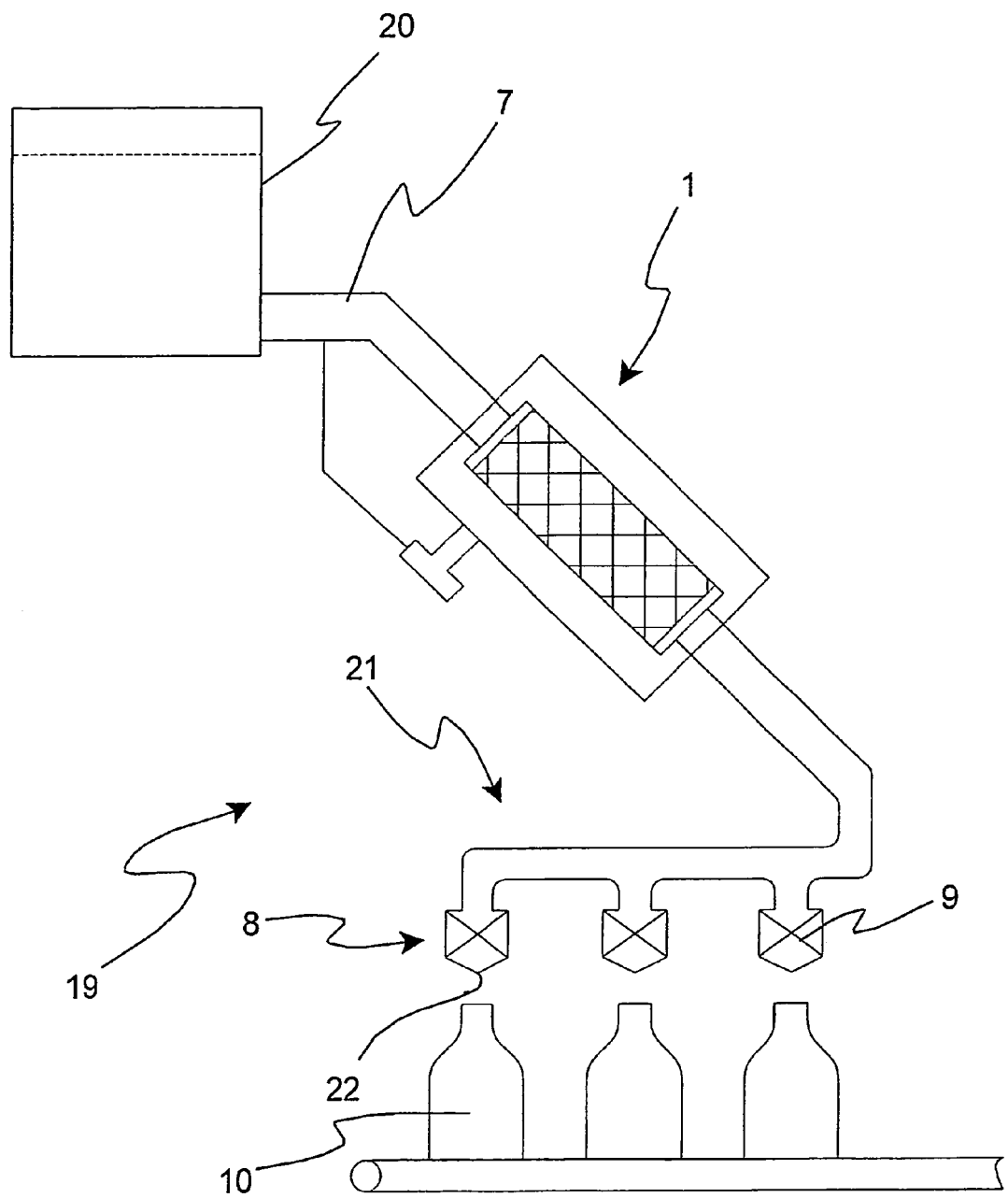
FIG. 6 is a schematic view of a system according to the invention.

FIG. 6 shows a preferred embodiment of an inventive system 19 for filling of containers 10. The system 19 comprises an inventive device 1 in accordance with what has been described with reference to, inter alia, FIG. 1.

The main components of the shown embodiment of the system 19 is a product tank 20, a product pipe 7 connected to the product tank 20, an inventive device 1 connected in series to the product pipe 7 and a filling machine 21 which is connected to the product pipe 7 and comprises three filling stations 8. The filling process at each filling station 8 is controlled by means of a filling valve 9, a filling pipe 22 extending from each filling valve 9.

It will be appreciated that additional filling machines 21 can be connected to the product pipe 7 and that each filling station 8 may comprise more than one filling valve 9.

A liquid product thus flows through the product pipe 7 from the product tank 20 through the inventive device 1 and up to the filling stations 8.

For filling a container 10, the filling pipe 22 of a filling station 8 is inserted into the container 10, after which the associated filling valve 9 is opened and the product is fed into the container 10.

The pressure drop that then arises in the system 19 is compensated for by the inventive device 1 by free collapsing of its tube portion 2.

Figure 7A:
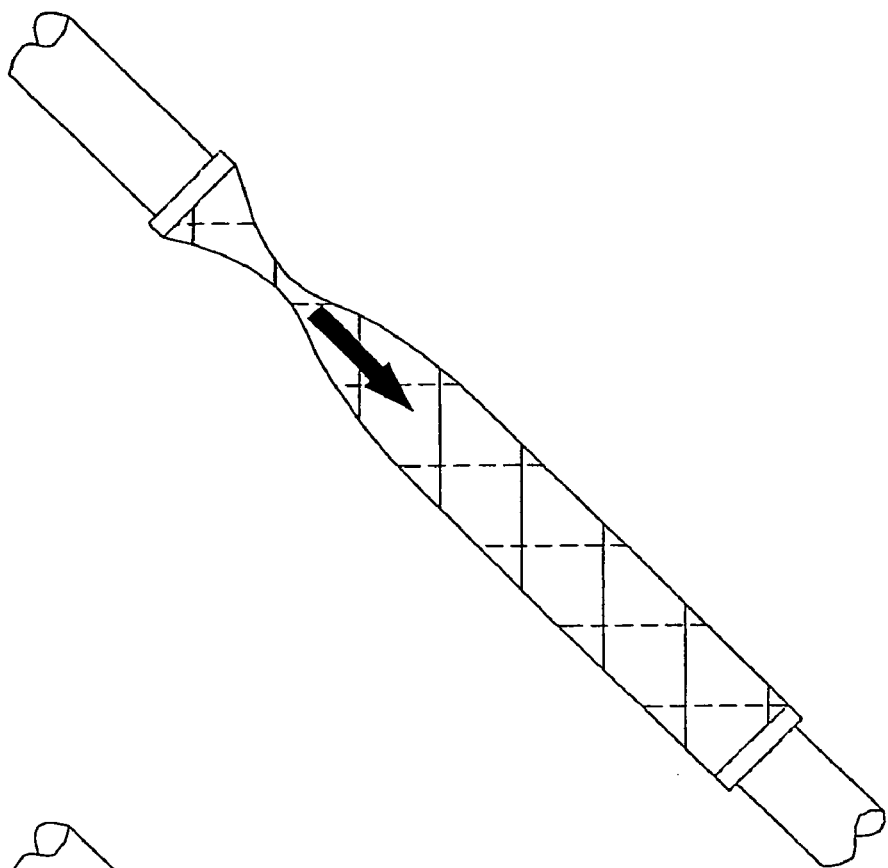
FIGS. 7a and 7b are side views of the device in a collapsed, angled state.
Figure 7B:
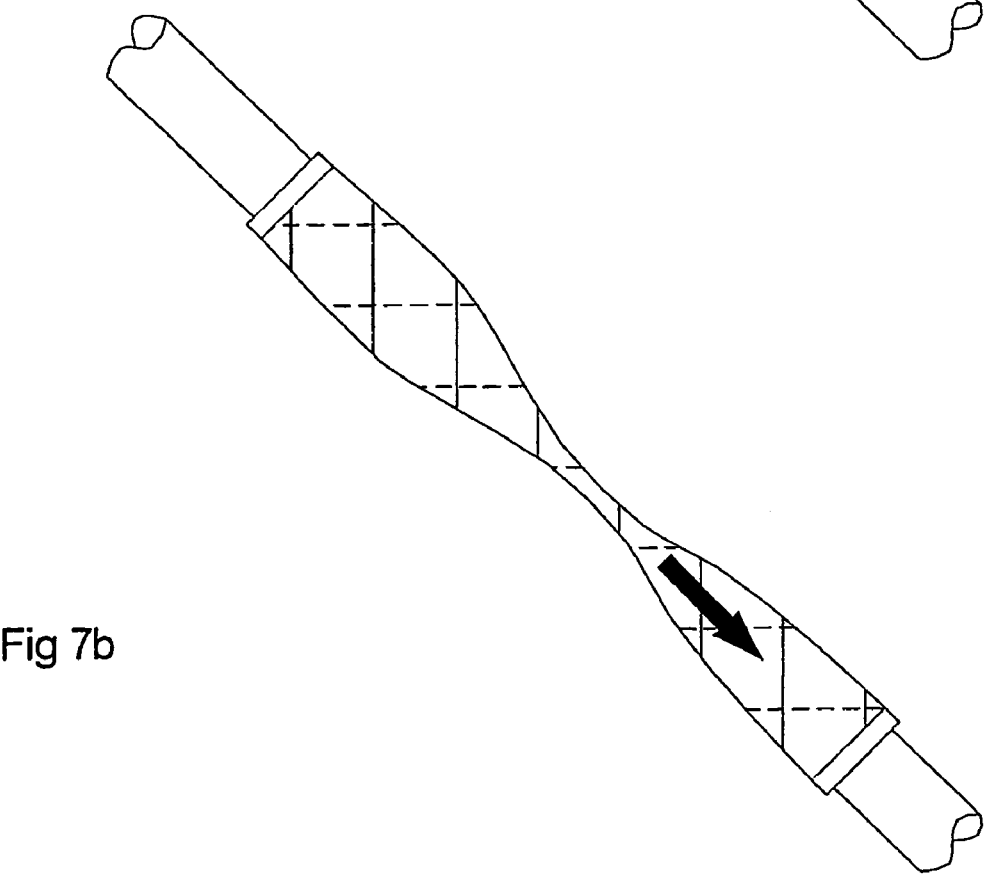

As is evident from the Figure, the inventive device 1 is mounted at an angle to a horizontal plane. More specifically, the device 1 is oriented so that its outlet 6 is arranged below its inlet 5. This ensures that the tube portion 2 collapses in a manner that promotes discharge of the product, which is illustrated in FIGS. 7a and 7b.

More specifically, the tube portion 2 will initially collapse in connection with said inlet 5. The reason for this is that the pressure in the tube portion 2, under the action of gravity, is somewhat higher at the outlet 6 than at the inlet 5. Thus, the tube portion 2 in connection with said inlet 5 will be more inclined to collapse than is the tube portion 2 in connection with the outlet 6.

As the pressure drops, the tube portion 2 will thus initially collapse in connection with the inlet 5, after which the collapsed part of the tube portion 2 will move, under continued action of gravity, towards the outlet 6 during the filling process. The discharge of the product from the inventive device will be greater than the supply of the product to the device from the product pipe, and therefore the collapsed part will grow as it moves towards the outlet, which is evident from FIG. 7b. By angling the device in the manner described above, it is thus ensured that the product is continuously pressed out from the inventive device 1 during the filling process, which for obvious reasons promotes accurate filling of containers 10.

According to the present invention, a device 1 for compensating for pressure drop in a product pipe 7 as well as a system 19 comprising such a device 1 are provided.

The device 1 comprises a collapsible tube portion 2 which is connectible to the product pipe 7. The device 1 further comprises a limiting means 3 which is adapted to counteract stretching of the tube portion 2 in the circumferential direction and also to allow free collapsing thereof.

Since the device comprises a tube portion 2 which is connectible directly to a product pipe 7, a device 1 is provided, which is extremely easy to clean and sterilise.

The free collapsibility of the tube portion 2 also ensures that a pressure drop in the product pipe 7 can effectively be compensated for.

Finally, the capability of the limiting means 3 of counteracting stretching of the tube portion 2 means that the risk of fatigue and damage owing to repeated stretching of the tube portion 2 is eliminated. This guarantees a satisfactory service life of the inventive device 1.

It will be appreciated that the present invention is not restricted to the embodiments illustrated.

Several modifications and variations are thus feasible, and therefore the present invention is exclusively defined by the appended claims.

The invention claimed is:

1. A system (19) for filling containers (10) with liquid contents, comprising a product pipe (7) which leads to at least one filling station (8) with at least one filling valve (9), comprising
a device (1) for compensating for pressure drop in the product pipe (7) through which a liquid flows, which device (1) is positioned upstream of said at least one filling station (8) and connected to said product pipe (7), wherein said device (1) comprises
a collapsible tube portion (2) connected to said product pipe (7), and
a limiting means (3),
which is inelastic in the circumferential direction and is adapted to counteract stretching of the tube portion (2) in the circumferential direction, and
which is flexible such that it is collapsible freely together with the tube portion (2).

2. A system as claimed in claim 1, wherein the tube portion (2) is essentially linearly extended and arranged at an angle to the horizontal plane.

3. A system as claimed in claim 2, wherein said angle is in the range 5–90°, more preferably in the range 10–45°, and most preferably in the range 25–35'.

4. A system as claimed in claim 1, wherein the limiting means (3) is integrated into a tube wall (14) of the tube portion (2).

5. A system as claimed in claim 4, wherein the limiting means (3) comprises a reinforcement (13) integrated into said tube wall (14).

6. A system as claimed in claim 1, wherein the limiting means (3) is arranged outside the tube portion (2).

7. A system as claimed in claim 1, wherein the limiting means (3) has such a tensile strength as to prevent stretching of the tube portion (2) in the circumferential direction at a pressure above atmospheric prevailing in the same in the range of 1–10 bar.

8. A system as claimed in claim 1, further comprising a casing (4), in which said tube portion (2) and said limiting means (3) are arranged, pressure means (15) being arranged to apply a pressure prevailing in the casing (4), which is slightly below a normal pressure prevailing in the tube portion (2) in operation.

9. A system as claimed in claim 8, wherein the pressure means (15) is a compressed air means (15).

10. A system as claimed in claim 1, wherein the tube portion (2) is flexible and stretchable.

* * * * *